(No Model.)
W. H. ROSS.
SOIL BREAKING MACHINE.
No. 529,959. Patented Nov. 27, 1894.
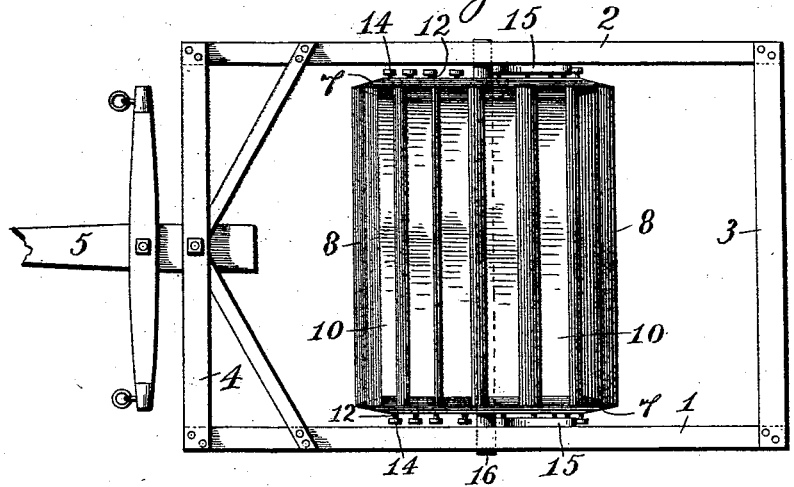
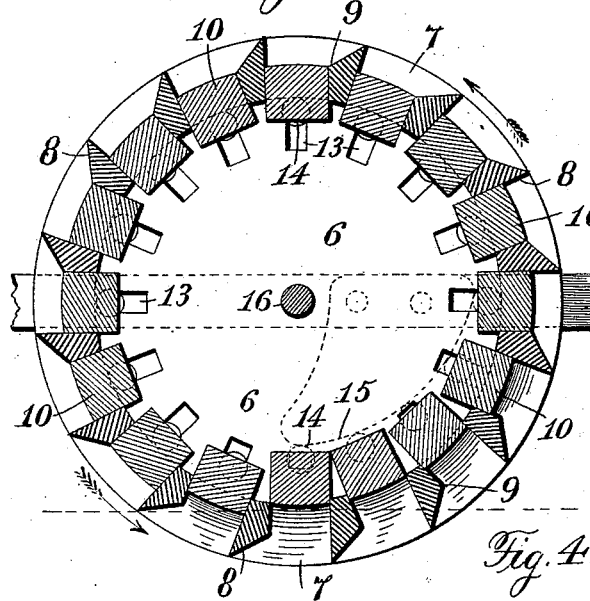
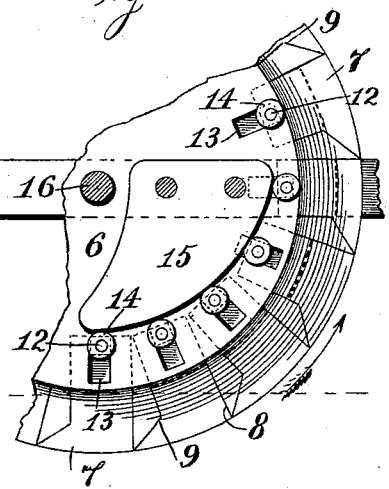
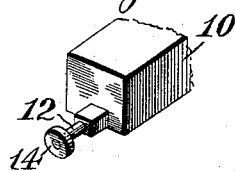
Witnesses:
Jas. E. Hutchinson.
J. G. Meyers Jr.
Inventor
William H. Ross,
by James L. Norris.
Attorney.
THE NORRIS PETERS CO., PHOTO-LITHO., WASHINGTON, D. C.

UNITED STATES PATENT OFFICE.

WILLIAM H. ROSS, OF WACO, TEXAS.

SOIL-BREAKING MACHINE.

SPECIFICATION forming part of Letters Patent No. 529,959, dated November 27, 1894.

Application filed April 25, 1894. Serial No. 508,990. (No model.)

*To all whom it may concern:*

Be it known that I, WILLIAM H. ROSS, a citizen of the United States, residing at Waco, in the county of McLennan and State of Texas, have invented new and useful Improvements in Soil-Breaking Machines, of which the following is a specification.

This invention has for its object to provide a new and improved machine particularly designed for cutting or breaking soil, plowing and grading, but useful for cutting clods, and for many other purposes not necessary to specifically mention.

The invention consists essentially in the combination of a main frame, a drum composed of heads and separated knives or cutters connecting the heads, each pair of knives having parallel adjacent surfaces, soil-ejector bars or blocks each having parallel sides fitting the parallel adjacent surfaces of two knives or cutters, and stationary cams rigidly fixed to opposite sides of the main frame for moving the soil-ejector-bars or blocks radially outward to eject the soil or dirt which is cut and taken up by the knives or cutters, and discharge the same on the ground in rear of the drum, or upon a carrier to be carried away to some desired point.

The invention also consists in certain other features of construction and combination or arrangement of parts hereinafter described and claimed, reference being made to the accompanying drawings, in which—

Figure 1 is a plan view of a soil-cutting or breaking machine constructed in accordance with my invention. Fig. 2 is a transverse sectional view of the drum. Fig. 3 is a detail view to illustrate the construction of the cams which act on the ejector-bars or blocks to move them radially outward, and Fig. 4, is a detail perspective view of a portion of one of the ejector-bars.

In order to enable those skilled in the art to make and use my invention, I will now describe the same in detail, referring to the drawings, wherein it will be observed that the main frame is composed of side-beams 1 and 2, and end-bars 3 and 4 rigidly connecting the side-beams to form a rectangular structure within which the drum or cylinder, hereinafter explained, is adapted to rotate as the machine is caused to traverse the ground.

The front portion of the main frame is provided with a tongue 5, and suitable means for the attachment of a team, but obviously if a single horse is to be used, the main frame will be provided with thills, or otherwise adapted to be drawn by a draft animal.

The rotating drum or cylinder is composed of two disk-shaped heads 6 having annular or circular cutters 7, so applied thereto as to constitute the peripheries of the heads, and provide cutters which sever or cut the earth in the line of draft. The circular or annular cutters constitute parts of the disk-heads and are rigidly secured to the ends of a plurality of knives or cutters 8, so disposed as to constitute the periphery of the drum. The knives or cutters are rigidly fixed in position, and are chisel-shaped at their cutting edges, as at 9, and are gradually reduced in thickness toward their inner sides, as will be clearly understood by reference to Fig. 2.

The sides of two adjacent knives or cutters are parallel, and between the knives or cutters are arranged a series of soil-ejector bars or blocks 10, adapted to be moved radially outward for the purpose of ejecting the soil or dirt which is cut and taken up by the knives or cutters as the drum rotates. The ejector-bars or blocks are rectangular in outline and approximately square in cross section, and are suitably constructed to be guided in their radial movements by the said parallel surfaces of the knives or cutters. The extremities of the ejector bars or blocks are provided with shafts 12 extending through radial slots 13 in the disk-heads 6, and on these shafts 12 are arranged anti-friction rollers, or other suitable bearings 14 adapted to be acted upon by cams 15 of any suitable form, and so constructed and arranged that as the drum rotates and the cutters or knives leave the soil after cutting and taking up a portion of the same, the ejector-bars or blocks are forced radially in an outward direction to eject the soil or dirt and discharge the same on the ground in rear of the drum, or upon a carrier to be carried away to some destined point.

I do not deem it necessary to illustrate a carrier, as such devices are well known parts of ditching or grading machines, and constitute no part of my present invention.

The cams 15 are stationary and are rigidly secured to the inner sides of the side-beams 1 and 2 at a point in rear of the axle 16 on or with which the drum rotates. The axle is supported in suitable bearings on the side-beams of the main frame, and the cams 15 are so constructed that they act on the anti-friction rollers or bearings 14 and force the soil-ejector-bars or blocks radially outward as the rearward side of the drum rises in the rotation thereof.

The soil-ejector-bars or blocks lie in their depressed positions until they approach the ground; and, since the inward sliding movements of the bars or blocks are limited by the inner ends of the slots 13, it will be obvious that the bars or blocks limit the depth to which the knives 8 cut the soil. I do not, however, confine myself to the specific construction of slots for limiting the inward sliding movements of the bars or blocks, as the same result can be attained by some other mechanical contrivances.

In the drawings, Figs. 2 and 3, the width and thickness of the knives or cutters 8, and ejector-bars or blocks 10, are not on a working scale, but are somewhat enlarged for the purpose of more clearly illustrating the general form or shape, and the manner in which the parts operate. The dimensions of the parts may be varied without affecting the spirit of the invention.

In the operation of the machine the knives or cutters 8 cut or sever the soil in lines at right angles to the line of draft, while the circular or annular cutters 7 cut the soil in lines parallel, or substantially so with the line of draft, and consequently the pocket-like receptacles or spaces between the knives or cutters are filled up with dirt or soil, which is carried upward and ejected.

By constructing the adjacent surfaces of the blades or cutters parallel with one another it is possible to use simple blocks or bars for ejecting the dirt, each block fitting the parallel surfaces of two blades or cutters, and thus preventing ingress of dirt to the interior of the drum.

By the employment of stationary cams rigidly attached to the opposite sides of the main frame, it is possible to make the axle stationary and have the drum rotate on the axle, or the axle may rotate and the drum turn with the axle.

The improved machine is useful for plowing or breaking the earth, and for ditching and grading, and many other purposes.

Having thus described my invention, what I claim is—

1. The combination of a drum composed of heads, and knives or cutters connecting the heads, soil-ejector-bars or blocks adapted to limit the depth of cutting, and slidable radially between the knives or cutters for ejecting the soil or dirt therefrom as the drum rotates, and stationary cams rigidly fixed to the opposite sides of the main frame for moving the ejector-bars or blocks radially outward, substantially as described.

2. The combination of a drum composed of disk-heads, and knives or cutters rigidly secured to the disk-heads, cutters arranged at the ends of the said knives for cutting the soil in the line of draft, ejector-bars or blocks slidable radially between the said knives or cutters for ejecting the soil or dirt therefrom as the drum rotates, and stationary cams rigidly fixed to the opposite sides of the main frame for moving the ejector-bars or blocks radially outward, substantially as described.

3. The combination of a main frame, stationary cams rigidly fixed to the opposite sides of the main frame, a drum journaled in the main frame and composed of disk-heads having radiating slots, annular cutters secured to the disk heads, and knives or cutters rigidly attached to the disk-heads each pair having parallel adjacent surfaces, soil ejector bars or blocks having parallel surfaces to fit the parallel surfaces of the said knives or cutters, and each bar or block having shafts extending through the radiating slots of the disk-heads, and bearings mounted on the said shafts and acted upon by the said stationary cams for moving the ejector-bars or blocks outward, substantially as described.

4. The combination of a main frame having cams rigidly fixed to its inner sides, a drum rotatable in the main frame and composed of heads, and knives or cutters rigidly connected with the heads, soil-ejector bars or blocks having end shafts projecting through the said heads and provided with bearings acted on by said rigidly fixed cams for sliding the ejector bars or blocks radially outward, and cutters for cutting the soil in the line of draft, substantially as described.

In testimony whereof I have hereunto set my hand and affixed my seal in presence of two subscribing witnesses.

WILLIAM H. ROSS. [L. S.]

Witnesses:
M. R. HAWKINS,
JOS. PERRY.